United States Patent Office 2,838,537
Patented June 10, 1958

---

2,838,537

6-FLUORO STEROIDS AND PROCESS

George B. Spero, Kalamazoo Township, Kalamazoo County, Barney J. Magerlein, Kalamazoo, and William P. Schneider and John A. Hogg, Kalamazoo Township, Kalamazoo County, Mich., assignors to The Upjohn Company, Kalamazoo, Mich., a corporation of Michigan No Drawing. Application November 29, 1957
Serial No. 699,500

10 Claims. (Cl. 260—397.45)

This invention relates to 1-dehydro-6,21-difluoro-9α-halo - 21 - desoxyhydrocortisone and 1 - dehydro - 6,21-difluoro-9α-halo-21-desoxycortisone and is more particularly concerned with 1-dehydro-6α,9α,21-trifluoro-21-desoxyhydrocortisone (6α,9α,21 - trifluoro - 11β,17α - dihydroxy - 1,4 - pregnadiene - 3,20 - dione), 1 - dehydro-6α,9α,21 - trifluoro - 21 - desoxycortisone (6α,9α,21-trifluoro - 17α - hydroxy - 1,4 - pregnadiene - 3,11,20-trione), and to processes for the production thereof.

The compounds of this invention, 1-dehydro-6,21-difluoro - 9α - halo - 21 - desoxyhydrocortisone and 1-dehydro - 6,21 - difluoro - 9α - halo - 21 - desoxycortisone, possess valuable anti-rheumatoid arithritic, anti-inflammatory and glucocorticoid activities in marked degree. Thus, for example, 1-dehydro-6α,9α,21-trifluoro-21 - desoxyhydrocortisone (6α,9α,21 - trifluoro - 11β,17α-dihydroxy-1,4-pregnadiene-3,20-dione) has been found to exhibit approximately ten to fifteen times the anti-inflammatory activity of hydrocortisone, and in addition has a favorable effect on body electrolyte balance. The compounds of this invention are useful in the treatment of inflammatory conditions of the skin, eyes and ears of humans and of valuable domestic animals, as well as contact dermatitis and other allergic reactions. Administration of the novel steroids can be in conventional dosage forms, such as pills, tablets, capsules, syrups or elixirs for oral use, or in liquid forms which are adaptable to the natural and synthetic cortical steroid hormones for injectable products. The novel compounds can also be administered topically in the form of ointments, creams, lotions and the like, with or without coacting antibiotics, germicides or other materials forming advantageous combinations therewith.

The compounds of this invention can be prepared in accordance with the following reactions:

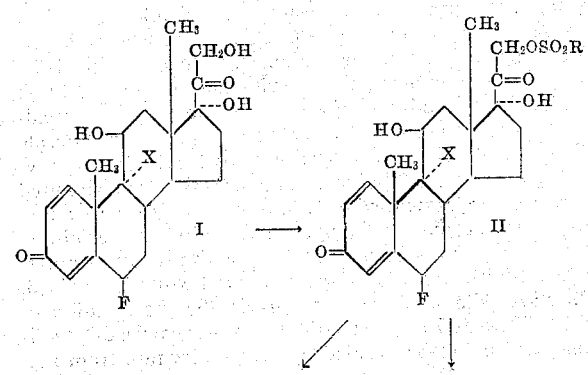

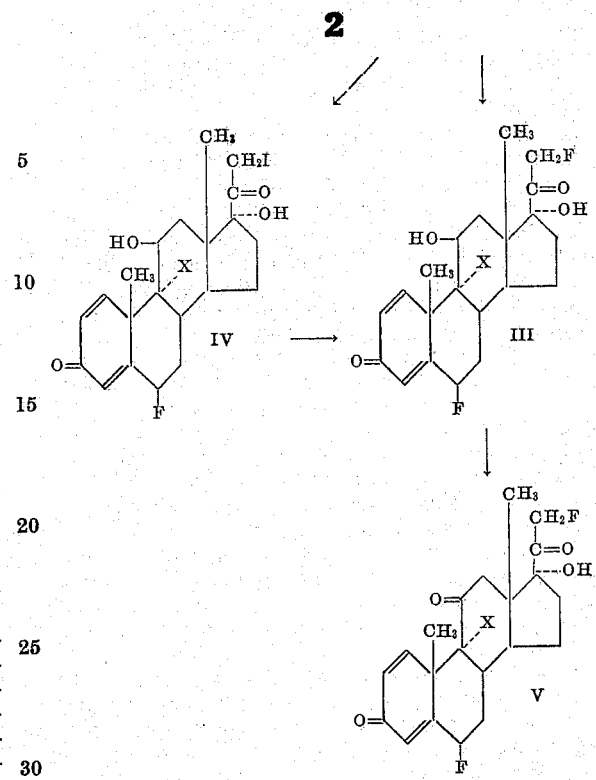

wherein R is an organic radical, particularly a hydrocarbon radical containing from one to ten carbon atoms, inclusive, such as methyl, ethyl, phenyl, tolyl, naphthyl, or the like, methyl being preferred, and wherein X is a halogen of atomic weight between seventeen and eighty, inclusive, i. e., fluorine, chlorine or bromine.

As indicated above and described in greater detail below, the reactions embodied in the processes characterizing this invention are susceptible of variation in the specific steps leading to the final products III and V, the precise sequence selected being determined by such factors as economics and convenience.

It is an object of the present invention to provide 1-dehydro - 6,21 - difluoro - 9α - halo - 21 - desoxyhydrocortisone (III) and 1-dehydro-6,21-difluoro-9α-halo-21-desoxycortisone (V) and more particularly to provide 1 - dehydro - 6α,9α,21 - trifluoro - 21 - desoxyhydrocortisone and 1 - dehydro - 6α,9α,21 - trifluoro - 21-desoxycortisone. A further object is to provide processes for the production of 1-dehydro-6,21-difluoro-9α-halo - 21 - desoxyhydrocortisone and 1 - dehydro - 6,21-difluoro-9α-halo-21-desoxycortisone, including the 6α and 6β epimers thereof.

The process of the present invention comprises treating 6 - fluoro - 9α - halo - 11β,17α,21 - trihydroxy - 1,4-pregnadiene - 3,20 - dione (1 - dehydro - 6 - fluoro - 9α-halohydrocortisone) (I) with an organic sulfonyl halide to obtain the corresponding 21-ester (II), a 21-alkyl or aryl sulfonate of 6-fluoro-9α-halo-11β,17α,21-trihydroxy-1,4-pregnadiene-3,20-dione, and thereafter treating the thus produced 21-alkyl or aryl sulfonate with a fluorinating agent to obtain the corresponding 6,21-difluoro-9α-halo - 11β,17α - dihydroxy - 1,4 - pregnadiene - 3,20 - dione (III). The 6,21-difluoro product above can be oxidized to give the corresponding 6,21-difluoro-9α-halo-17α-hydroxy-1,4-pregnadiene-3,11,20-trione (V). Alternatively, the 6 - fluoro - 9α - halo - 11β,17α,21 - trihydroxy - 1,4-pregnadiene-3,20-dione 21-alkyl or aryl sulfonate can be reacted with an iodinating agent such as sodium iodide to produce the corresponding 21-iodo steroid (IV), which can be fluorinated to yield the 21-fluoro steroid (III). Similarly, when the 11-keto analogue (1-dehydro-6-fluoro-9α-halocortisone) is utilized as the starting material in the above series of reactions, 6,21-difluoro-9α-halo-17α - hydroxy - 1,4 - pregnadiene - 3,11,20 - trione (V) is produced directly without the step of oxidation of the 11β-hydroxyl.

The starting steroids for the compounds and process of the present invention are 1-dehydro-6-fluoro-9α-halo-hydrocortisone and 1-dehydro-6-fluoro-9α-halocortisone and are prepared in accordance with the procedures of Preparations 1 through 26 herein. The preferred compounds containing the 17(20)-double bond have the cis configuration because they are convertible in higher yields in the oxidative hydroxylation step than are the trans isomers, although both are operative.

In carrying out the process of this invention, 1-dehydro-6-fluoro-9α-halohydrocortisone is treated with an organic sulfonyl halide such as methanesulfonyl chloride, toluenesulfonyl chloride, toluenesulfonyl bromide, benzenesulfonyl chloride, naphthylsulfonyl chloride, and the like, the methanesulfonic acid halides, especially methanesulfonyl chloride, being preferred. In the preferred embodiment of this invention, the starting steroid is usually reacted with the alkyl or aryl sulfonyl halide in solution in a solvent such as pyridine, benzene, toluene, or the like. Where such solvents as benzene and toluene are employed, an amount of an amine base such as pyridine at least equal to the molar amount of the sulfonyl halide should also be present to react with the halogen acid formed. Reaction of the alkyl or aryl sulfonyl halide is conducted preferably at temperatures between minus ten and plus sixty degrees centigrade, provided that at the lower temperatures the solvent has not solidified. Thus, for pyridine, dioxane, toluene, or the like, temperatures in the range of zero to ten degrees centigrade can be used, while for benzene only temperatures above five degrees centigrade are suitable because of the relatively high freezing point of benzene. The reaction time is usually between about four and 24 hours, after which the product, 6 - fluoro - 9α - halo - 11β,17α,21 - trihydroxy-1,4-pregnadiene-3,20-dione 21-alkyl or aryl sulfonate (II), is recovered in a conventional manner, such as, for example, by evaporating the solvent until a dry residue is obtained or by diluting the reaction mixture with water and precipitating the product with dilute hydrochloric acid.

The 6 - fluoro - 9α - halo - 11β,17α,21 - trihydroxy-1,4-pregnadiene-3,20-dione 21-alkyl or aryl sulfonate can first be converted to the corresponding 21-iodo compound (IV) which is readily convertible to the 21-fluoro steroid. The 21-iodo compound is prepared by reacting the said 21-alkyl or aryl sulfonate with an iodinating agent, such as alkali metal iodide, e. g., sodium, potassium or lithium iodide, in an oxygenated hydrocarbon solution such as an alkanone solution, e. g., acetone. A molar excess of the iodide (three to twenty moles of iodide per mole of steroid) is preferred for this reaction. The reaction mixture containing the 21-alkyl or aryl sulfonate and the alkali metal iodide in solution is heated to reflux for a period of about three minutes to thirty minutes. The thus produced 6 - fluoro - 9α - halo - 21 - iodo - 11β,17α - dihydroxy-1,4-pregnadiene-3,20-dione can then be isolated by evaporating the solvent or by drowning out with water and filtering. For the subsequent reaction, the 21-iodo steroid can be used either in purified form as a product of recrystallization from such organic solvents as acetone, ethanol, and the like, or it can be employed directly as a crude product in the next step of the synthesis.

The 21-iodo steroid (IV), dissolved in a solvent such as acetonitrile, dimethylformamide or ethylene glycol, is treated with a metal fluoride such as silver fluoride, antimony fluoride, potassium fluoride, or the like, acetonitrile and silver fluoride being preferred. The metal fluoride should be added in small quantities at intervals, and the reaction mixture should be protected from light during the reaction period, which usually ranges from about one-half to six hours. The reaction mixture is then concentrated and the product extracted as in previous purification steps to yield essentially pure 6,21-difluoro-9α-halo-11β,17α-dihydroxy-1,4-pregnadiene-3,20-dione.

Alternatively, the 6-fluoro-9α-halo-11β,17α,21-trihydroxy-1,4-pregnadiene-3,20-dione 21-alkyl or aryl sulfonate is reacted with a fluorinating agent such as potassium fluoride, silver fluoride or antimony fluoride in an inert solvent such as dimethylsulfoxide, acetonitrile, dimethylformamide or ethylene glycol solution, the preferred combination being potassium fluoride in dimethylsulfoxide. The reaction is advantageously conducted under continuous heating, and it proceeds generally for a period of about six to 24 hours, fifteen to twenty hours usually being sufficient. The reaction mixture is then diluted with water and extracted with an organic solvent such as methylene chloride, chloroform, benzene, and the like, and purified in a conventional manner, as, for example, by chromatography or recrystallization.

The foregoing reactions constituting either the principal or alternative routes can likewise be conducted on the corresponding 11-keto analogues.

The oxidation of 6,21-difluoro-9α-halo-11β,17α-dihydroxy-1,4-pregnadiene-3,20-dione can be carried out by a variety of methods, such as, for example, by oxidizing the said 6,21-difluoro steroid in acetic acid solution with chromium trioxide, using molar quantities or a slight excess, such as from ten to thirty percent excess, or by oxidizing with a haloamide or imide of an acid, such as N-bromoacetamide, N-chlorosuccinimide, or N-bromosuccinimide dissolved in pyridine, dioxane, or other suitable solvents. At the conclusion of the desired oxidation reaction, the excess oxidant is generally destroyed by addition of methyl alcohol, ethyl alcohol, and the like for the chromic acid oxidant or a bisulfite for N-bromoacetamide, N-bromosuccinimide and other N-halo acyl amides and imides. Thereafter, the resulting 6,21-difluoro - 9α - halo - 17α - hydroxy - 1,4 - pregnadiene - 3,11,20-trione is recovered by conventional means, such as by extraction with water-immiscible solvents, e. g., methylene chloride, ether, benzene, toluene or the like, or by chromatography.

As hereinbefore indicated, the processes for the preparation of the products of the present invention are susceptible of variation. As shown in Preparations 13 through 16 1-dehydro-6-fluorohydrocortisone acetate is converted to 1-dehydro-6-fluoro-9α-halohydrocortisone acetate by introduction of the 9α-halogen into the molecule. The 1-dehydro-6-fluoro-9α-halohydrocortisone is then fluorinated at carbon atom 21 as shown in the examples. Alternatively, if desired, fluoroination at carbon atoms 21 can be done first and this can then be followed by halogenation at carbon atom 9. Thus, treating 1-dehydro-6-fluorohydrocortisone with an organic sulfonyl halide is productive of the 21-sulfonate which on treatment with a fluorinating agent such as potassium fluoride or silver fluoride gives 6,21-difluoro-11β,17α-dihydroxy-1,4-pregnadiene-3,20-dione. The 6,21-difluoro compound can be dehydrated with N-bromoacetamide and anhydrous sulfur dioxide in pyridine solution by permitting the reaction to continue until a negative acidified potassium iodide-starch test of the reaction mixture is obtained. Dilution with cold water results in the precipitation of 6,21-difluoro-17α-hydroxy-1,4,9(11)-pregnatriene-3,20-dione, which can be purified by recrystallization from acetone. The crystalline product can then be reached in methylene chloride-tertiary butyl alcohol solution with perchloric acid and N-bromoacetamide or N-iodosuccinimide to produce a reaction mixture from which 6,21-defluoro-9α-bromo-11β,17α-dihydroxy-1,4-pregnadiene-3,20-dione or the corresponding 6,21-difluoro-9α-iodo compound can be recovered by precipitation with ice water and recrystallization from acetone. The latter steroids can then be reacted in acetone solution with anhydrous potassium acetate at reflux temperatures to produce 6,21-difluoro - 9,11 - oxido-17α-hydroxy-1,4-pregnadiene-3,20-dione, which is recoverable from the reaction mixture by chromatography and can be further purified by recrystallization from Skellysolve B hexanes-acetone. Reaction of the said 9,11-oxido compound in methylene chloride solution with aqueous hydrogen fluoride or liquid hydrogen fluoride in the presence of tetrahydrofuran is productive of 6,9α,21-trifluoro-11β,17α-dihydroxy-1,4-pregnadiene-3,20-dione. Substitution of aqueous hydrogen chloride for the hydrogen fluoride above yields 6,21-difluoro - 9α - chloro-11β,17α-dihydroxy-1,4-pregnadiene-3,20-dione. If desired, either the 9α-fluoro or chloro product can be oxidized, for example, with N-bromoacetamide in pyridine solution, or with chromic acid to give 6,9α,21-trifluoro-17α-hydroxy-3,11,20-trione or the corresponding 9α-chloro compound.

In the foregoing processes, it should be understood that the corresponding 6β-halo epimer can be utilized at any stage and the 6α-epimer obtained at appropriate intermediate stages by treatment of the 6β-compound, at temperatures of zero degrees centigrade or slightly lower, in an organic solvent such as chloroform and in the presence of alcohol, with an anhydrous mineral acid, such as hydrochloric acid. The reduced temperatures should be maintained throughout the period of addition of the acid. The reaction mixture can then be washed with successive portions of dilute alkali and water and evaporated under reduced pressure to obtain the 6α-epimer in high yield.

The following preparations and examples are illustrative of the process and products of the present invention but are not to be construed as limiting.

PREPARATION 1

*3-ethylene ketal of methyl 3,11-diketo-5α,6α-oxido-17(20)-[cis]-pregnen-21-oate*

To a solution of five grams of the 3-ethylene glycol ketal of methyl 3,11-diketo-4,17(20)-[cis]-pregnadien-21-oate, prepared in the manner described in U. S. Patent 2,707,184, in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was washed with a five percent aqueous solution of sodium bicarbonate and then with water. The chloroform layer was separated, dried and the solvent distilled to give a residue of 5.3 grams of solid. Crystallization of this solid from methanol gave 2.24 grams of product melting at 180 to 195 degrees centigrade, and after two crystallizations from methanol there was obtained pure 3-ethylene ketal of methyl 3,11-diketo-5α,6α-oxido-17(20)-[cis]-pregnen-21-oate melting at 206 to 209 degrees centigrade and having an $[\alpha]_D$ of plus 37 degrees (CHCl$_3$) and the following analysis:

Calculated for $C_{24}H_{32}O_6$: C, 69.20; H, 7.75. Found: C, 69.59; H, 7.81.

PREPARATION 2

*Methyl 3,11-diketo-5α,6β-dihydroxy-17(20)-allopregnen-21-oate and methyl 3,11-diketo-5α-hydroxy-6β-fluoro-17(20)-allopregnen-21-oate*

To a solution of 1.73 grams of 3-ethylene ketal of methyl 3,11-diketo-5α,6α-oxido-17(20)-[cis]-pregnen-21-oate in sixteen milliliters of methylene chloride was added six milliliters of 48 percent hydrofluoric acid. The heterogeneous mixture was stirred for two hours, made slightly basic with 300 milliliters of five percent sodium bicarbonate solution, and extracted with methylene chloride. The extract was washed, dried, and evaporated to dryness to give 1.62 grams of crude solid. Purification by chromatography over synthetic magnesium silicate gave two fractions: A, 481 milligrams eluted with methylene chloride plus five percent acetone, and B, 921 milligrams eluted with methylene chloride plus ten and twenty percent acetone. Crystallization of fraction A from acetone-Skellysolve B hexanes gave 390 milligrams of methyl 3,11-diketo-5α-hydroxy-6β-fluoro-17(20)-allopregnen-21-oate, melting point 254 to 260 degrees centigrade. The analytical sample melted at 260 to 263 degrees centigrade.

*Analysis.*—Calculated for $C_{22}H_{29}O_5F$: F, 4.84. Found: F, 4.47.

PREPARATION 3

*Methyl 3,11 - diketo - 5α-hydroxy-6β-fluoro-17(20)-allopregnen-21-oate 3-ethylene ketal*

A mixture of 1.9 grams of methyl 3,11-diketo-5α-hydroxy - 6β - fluoro-17(20)-allopregnen-21-oate, 59 milligrams of p-toluenesulfonic acid monohydrate and 31 milliliters of distilled ethylene glycol was added to 800 milliliters of benzene. The mixture was stirred and refluxed for two hours, with the condensate passing through a water trap to remove the water. After reflux the mixture was cooled, washed with water and evaporated to dryness to give a crude solid which on recrystallization from acetone-Skellysolve B hexanes gave 1.96 grams of methyl 3,11-diketo-5α-hydroxy-6β-fluoro-17(20)-allopregnen-21-oate 3-ethylene ketal, melting point 170 to 173 degrees centigrade.

Following the above procedure, substituting other dihydric alcohols for ethylene glycol, for example, 1,2-propylene glycol, 2,3-butanediol, 1,3-butanediol and 2,3-pentanediol, is productive of the respective 3-alkylene ketals of methyl 3,11-diketo-5α-hydroxy-6β-fluoro-17-(20)-allopregnen-21-oate.

PREPARATION 4

*5α,11β,21-trihydroxy-6β-fluoro-17(20)-allopregnen-3-one 3-ethylene ketal*

To a solution of 1.96 grams of methyl 3,11-diketo-5α-hydroxy-6β-fluoro-17(20)-allopregnen-21-oate 3-ethylene ketal in 850 milliliters of anhydrous ether was added 3.7 grams of lithium aluminum hydride. The mixture was stirred for a period of one hour, and 200 milliliters of water was added slowly, the ether phase separating. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give 1.30 grams of 5α,11β,21-trihydroxy - 6β - fluoro - 17(20)-allopregnen-3-one 3-ethylene ketal, melting point 197 to 205 degrees centigrade. An additional 226 milligrams was obtained from the mother liquor, melting point 175 to 185 degrees centigrade.

PREPARATION 5

*5α,11β-dihydroxy-6β-fluoro-21-acetoxy-17(20)-allopregnen-3-one 3-ethylene ketal*

The acetate was prepared by allowing 0.87 gram of 5α,11β,21-trihydroxy - 6β - fluoro-17(20)-allopregnen-3-one 3-ethylene ketal to stand overnight in ten milliliters of acetic anhydride and ten milliliters of pyridine. The solution was then poured into ice water to give 0.92 gram of 5α,11β-dihydroxy-6β-fluoro-21-acetoxy-17(20)-allopregnen-3-one 3-ethylene ketal, melting point 140 to 150 degrees centigrade, which on recrystallization from acetone-Skellysolve B hexanes gave 0.77 gram, melting point 149 to 153 degrees centigrade.

Similarly, other 21-organic carboxylic esters of 5α,11β,21-trihydroxy-6β-fluoro - 17(20) - allopregnen-3-one 3-ethylene ketals can be prepared wherein the 21-acyloxy group is formyloxy, propionyloxy, butyryloxy, valeryloxy, hexanoyloxy, heptanoyloxy, octanoyloxy, benzoyloxy, phenylacetoxy, and the like, by contacting 5α,11β,21-trihdroxy - 6β - fluoro - 17(20)-allopregnen-3-one 3-ethylene ketal with the appropriate acylating agent, e. g., the anhydride or acid halide of the selected acid in a solvent such as benzene, toluene, pyridine, or the like.

PREPARATION 6

*5α,11β,17α-trihydroxy-6β-fluoro-21-acetoxyallopregnane-3,20-dione 3-ethylene ketal*

To a solution of 0.77 gram of 5α,11β-dihydroxy-6β-fluoro-21-acetoxy - 17(20) - allopregnen-3-one 3-ethylene ketal in 35 milliliters of tertiary butyl alcohol was added one milliliter of pyridine, 1.9 milliliters of N-methylmorpholine oxide peroxide solution, and 13.1 milliliters of osmium tetroxide (9.1 milliliters of tertiary butyl alcohol solution containing 1.44 milligrams of osmium tetroxide per milliliter). The solution was stirred for a period of 2.5 hours and fifteen milliliters of five percent sodium hydrosulfite was added. Stirring was continued for an additional ten minutes, at which time 0.7 gram of finely ground synthetic magnesium silicate was mixed into the solution for a period of twenty minutes and then removed by filtration. The filtrate was evaporated to dryness under reduced pressure at a temperature of less than fifty degrees centigrade. The residue was dissolved in methylene chloride, washed with water, dried and evaporated to dryness. This residue was crystallized from acetone-Skellysolve B hexanes to give 0.47 gram of 5α,11β,17α-trihydroxy-6β-fluoro - 21-acetoxyallopregnane-3,20-dione 3-ethylene ketal, melting point 220 to 228 degrees centigrade.

PREPARATION 7

*5α,11β,17α-trihydroxy-6β-fluoro-21-acetoxyallopregnane-3,20-dione*

A solution of 0.47 gram of 5α,11β,17α-trihydroxy-6β-fluoro-21-acetoxyallopregnane-3,20-dione 3-ethylene ketal in 35 milliliters of acetone and four milliliters of 1 N sulfuric acid solution was gently boiled on a steam bath for ten minutes, cooled and neutralized with dilute sodium bicarbonate solution. Addition of water followed by cooling gave 0.33 gram of 5α,11β,17α-trihydroxy-6β-fluoro-21-acetoxyallopregnane-3,20-dione, melting point 230 to 240 degrees centigrade.

PREPARATION 8

*6β-fluoro-11β,17α-dihydroxy-21-acetoxy-4-pregnene-3,20-dione (6β-fluorohydrocortisone acetate)*

A solution of 100 milligrams of 5α,11β,17α-trihydroxy-6β-fluoro-21-acetoxyallopregnane-3,20-dione in 4.9 milliliters of acetic acid and 0.1 milliliter of water was refluxed for a period of one hour, cooled, diluted with fifty milliliters of water and evaporated to dryness under reduced pressure. The residue was chromatographed over synthetic magnesium silicate to give one fraction (77 milligrams) eluted with methylene chloride plus ten percent acetone. Crystallization from acetone-Skellysolve B hexanes gave 38 milligrams of 6β-fluoro-11β,17α-dihydroxy-21-acetoxy-4-pregnene-3,20-dione (6β-fluorohydrocortisone acetate), melting point 210 to 218 degrees centigrade. Infrared data and ultraviolet data were in agreement with the structure.

PREPARATION 9

*6β-fluoro-11β,17α-dihydroxy-21-acetoxy-4-pregnene-3,20-dione (6α-fluorohydrocortisone acetate)*

A solution of 0.132 gram of 6β-fluoro-11β,17α-dihydroxy-21-acetoxy-4-pregnene-3,20-dione in twelve milliliters of chloroform and 0.1 milliliter of absolute alcohol was cooled to minus ten degrees centigrade in an ice-salt bath. A stream of anhydrous hydrochloric acid was gently bubbled through the solution for 2.5 hours, during which period the temperature was maintained between minus five and minus fifteen degrees centigrade. The solution was then diluted with 25 milliliters of chloroform, washed with dilute aqueous sodium bicarbonate solution, dried over anhydrous sodium sulfate, and evaporated to dryness under reduced pressure at sixty degrees centigrade. Crystallization of the residue from acetone-Skellysolve B hexanes gave 42 milligrams of the isomerized product, 6α-fluoro-11β,17α-dihydroxy-21-acetoxy-4-pregnene-3,20-dione, which melted at 203 to 210 degrees centigrade.

PREPARATION 10

*6α-fluoro-11β,17α,21-trihydroxy-4-pregnene-3,20-dione (6α-fluorohydrocortisone)*

A solution of 1.1 grams of 6α-fluoro-11β,17α-dihydroxy-21-acetoxy-4-pregnene-3,20-dione, one gram of potassium bicarbonate, 100 milliliters of methanol and fifteen milliliters of water were mixed together and purged with nitrogen to remove dissolved oxygen while stirring at 25 degrees centigrade for four hours. The solution was then neutralized by addition of acetic acid and distilled under vacuum to remove the methanol. The residue was extracted with 100 milliliters of methylene dichloride, and the extract was dried over sodium sulfate and passed through a column containing eighty grams of synthetic magnesium silicate. The fraction eluted with Skellysolve B hexanes plus twenty and thirty percent acetone weighed 770 milligrams, representing a yield of 77.5 percent. Recrystallization of a portion of this crude product from ethyl acetate-Skellysolve B hexanes gave crystals melting at 192 to 195 degrees centigrade.

PREPARATION 11

*1-dehydro-6α-fluorohydrocortisone*

Five 100-milliliter portions of a medium, in 250-milliliter Erlenmeyer flasks, containing one percent glucose, two percent corn steep liquor (sixty percent solids) and tap water, were adjusted to a pH of 4.9. This medium was sterilized for 45 minutes at fifteen pounds per square inch pressure and inoculated with a one to two day growth of *Septomyxa affinis* A. T. C. C. 6737. The Erlenmeyer flask was shaken at room temperature (about 26 to 28 degrees centigrade) for a period of three days. At the end of this period this 500-milliliter volume was used as an inoculum for ten liters of the same glucose-corn steep liquor medium which in addition contained ten milliliters of an antifoam compound (a mixture of lard oil and octadecanol). The fermenter was placed into the water-bath, adjusted to 28 degrees centigrade and the contents stirred (300 R. P. M.) and aerated (0.3 liter air to five liters of beer). After 24 hours of incubation, when a good growth had been developed, five grams of 6α-fluorohydrocortisone acetate plus one-half gram of 3-ketobisnor-4-cholen-22-al, dissolved in 25 milliliters of dimethylformamide was added and the incubation carried out at the same temperature (28 degrees centigrade) and aeration for a period of 72 hours (final pH 8.3). The mycelium was filtered off and washed with water. The wash water was combined with the filtrate and the whole was extracted with three two-liter portions of a mixture of methylenechloride-ethyl acetate (3:1). Removal of the solvent by evaporation gave 5.25 grams of crude solid which was triturated twice with four milliliters of methylene chloride to give 2.4 grams of 1-dehydro-6α-fluorohydrocortisone of melting point 198 to 203 degrees centigrade. The analytical sample, recrystallized from acetone, melted at 202 to 204 degrees centigrade. Analysis gave [α]$_D$ plus 73 degrees (dioxane) and the following:

Analysis.—Calculated for $C_{21}H_{27}O_5F$: C, 66.65; H, 7.10; F, 5.02. Found: C, 66.68; H, 7.19; F, 5.49.

Substitution of the 6β-epimer for the starting material above is productive of 1-dehydro-6β-fluorohydrocortisone. The 6β-epimer can be converted to the 6α-epimer following the procedure of Preparation 9.

PREPARATION 12

*6α-fluoro-11β,17α-dihydroxy-21-acetoxy-1,4-pregnadiene-3,20-dione (1-dehydro-6α-fluorohydrocortisone acetate)*

A solution of two grams of 1-dehydro-6α-fluorohydrocortisone in ten milliliters of pyridine and ten milliliters of acetic anhydride was allowed to stand at room temperature for seventeen hours, and was then poured into a mixture of ice and water. The resulting crystalline product was isolated by filtration, washed with water and dried. The yield of 1-dehydro-6α-fluorohydrocortisone acetate was 1.32 grams of melting point 232 to 237 degrees centigrade. The analytical sample melted at 238 to 242 degrees centigrade. Analysis gave [α]$_D$ plus 102 degrees (acetone) and the following:

Analysis.—Calculated for $C_{23}H_{29}O_6F$: C, 65.70; H, 6.95; F, 4.52. Found: C, 65.58; H, 7.16; F, 4.39.

PREPARATION 13

*6α-fluoro-17α-hydroxy-21-acetoxy-1,4,9(11)-pregnatriene-3,20-dione*

To a solution of 1.05 grams of 1-dehydro-6α-fluorohydrocortisone acetate in ten milliliters of pyridine was added 0.517 gram of N-bromoacetamide. The mixture was allowed to stand under nitrogen for fifteen minutes, at which time it was cooled to five degrees centigrade. While stirring, sulfur dioxide was passed over the surface until the solution gave no color change with acidified starch-iodide paper. The temperature of the reaction mixture was not allowed to go above twenty degrees centigrade during the sulfur dioxide addition. The mixture was then poured into 100 milliliters of ice-water, resulting in precipitation of 977 milligrams of 6α-fluoro-17α-hydroxy-21 - acetoxy - 1,4,9(11) - pregnatriene - 3,20-dione, melting point 186 to 196 degrees centigrade (with decomposition). The analytical sample melted at 213 to 216 degrees centigrade (with decomposition). Analysis gave [α]$_D$ plus 34 degrees (acetone) and the following:

Analysis.—Calculated for $C_{23}H_{27}O_5F$: C, 68.64; H, 6.76; F, 4.72. Found: C, 68.85; H, 6.86; F, 4.72.

PREPARATION 14

*6α-fluoro-9α-bromo-11β,17α-dihydroxy-21 - acetoxy - 1,4-pregnadiene-3,20-dione (1-dehydro-6α-fluoro-9α-bromohydrocortisone acetate)*

To a solution of 1.27 grams of 6α-fluoro-17α-hydroxy-21-acetoxy-1,4,9(11)-pregnatriene-3,20-dione in 19.5 milliliters of methylene chloride was added 38 milliliters of tertiary butyl alcohol, a solution of three milliliters of 72 percent perchloric acid in 22.5 milliliters of water, and a solution of 0.55 gram of N-bromoacetamide in 9.6 milliliters of tertiary butyl alcohol. After stirring for fifteen minutes, a solution of 0.55 gram of sodium sulfite in thirty milliliters of water was added and the mixture concentrated under reduced pressure at sixty degrees centigrade until crystallization occurred. After cooling in an ice bath, 100 milliliters of water was added with stirring. On filtering the crystalline product, followed by washing with water and drying, a yield of 1.59 grams of essentially pure 6α-fluoro-9α-bromo-11β,17α-dihydroxy-21-acetoxy-1,4-pregnadiene-3,20-dione, melting point 188 to 191 degrees centigrade (with decomposition) was obtained. The product was used in the succeeding example without further purification.

Substitution of N-iodosuccinimide for the N-bromoacetamide in the foregoing reaction is productive of the corresponding 9α-iodo product.

PREPARATION 15

*6α-fluoro-9β,11β-oxido-17α-hydroxy-21-acetoxy-1,4-pregnadiene-3,20-dione*

A mixture of 1.749 grams of 6α-fluoro-9α-bromo-11β,17α-dihydroxy-21-acetoxy-1,4-pregnadiene-3,20-dione (1-dehydro-6α-fluoro-9α-bromohydrocortisone acetate), 1.749 grams of potassium acetate, and fifty milliliters of acetone was stirred and heated at reflux temperature for eighteen hours. The reaction mixture was then concentrated to about one-half the original volume, cooled and poured into 300 milliliters of water to give 1.303 grams of 6α-fluoro-9β,11β - oxido - 17α-hydroxy-21-acetoxy-1,4-pregadiene-3,20-dione, melting point 234 to 238 degrees centigrade (with decomposition). The analytical sample, recrystallized from acetone, melted at 257 to 260 degrees centigrade. Analysis gave [α]$_D$ plus seventy degrees (acetone) and the following:

Analysis.—Calculated for $C_{23}H_{27}O_6F$: C, 66.01; H, 6.50; F, 4.54. Found: C, 65.73; H, 6.58; F, 3.87.

PREPARATION 16

*6α,9α - difluoro-11β,17α-dihydroxy-21-acetoxy-1,4-pregnadiene - 3,20-dione (1-dehydro-6α,9α-difluorohydrocortisone acetate)*

To 5.2 grams of liquid hydrogen fluoride cooled in Dry-Ice bath, was added, portion-wise, a slurry of 2.276 grams of 6α-fluoro-9β,11β-oxido-17α-hydroxy-21-acetoxy-1,4-pregnadiene-3,20-dione in nine grams of tetrahydrofuran (distilled over NaOH) and 28 milliliters of methylene chloride which had similarly been cooled in a Dry-Ice bath. The steroid dissolved completely. After standing at zero to five degrees centigrade for seventeen hours, the reaction mixture was poured slowly into a stirred mixture of 500 milliliters of water and 25 grams of sodium bicarbonate. The mixture was stirred for a few minutes, and the product was extracted with three 100-milliliter portions of methylene chloride. The methylene chloride solution was washed with water, dried, and chromatographed over synthetic magnesium silicate. The fraction eluted from the column with fifteen and twenty percent acetone in Skellysolve B hexanes was recrystallized from ethyl acetate-Skellysolve B hexanes to give 1.342 grams of product, melting point 238 to 242 degrees centigrade. The analytical sample melted at 239 to 242 degrees centigrade. Analysis gave [α]$_D$ plus 91 degrees (acetone) and the following:

Analysis.—Calculated for $C_{23}H_{28}O_6F_2$: C, 63.00; H, 6.44; F, 8.67. Found: C, 63.23; H, 6.82; F, 8.14.

Substitution of aqueous hydrogen chloride for the hydrogen fluoride above is productive of the corresponding 9α-chloro product.

PREPARATION 17

*6α,9α - difluoro-11β,17α,21-trihydroxy-1,4-pregnadiene-3,20-dione (1-dehydro-6α,9α-difluorohydrocortisone)*

Nitrogen was bubbled through a solution of 1.4 grams of 6α,9α-difluoro-11β,17α-dihydroxy-21-acetoxy-1,4-pregnadiene-3,20-dione (1-dehydro-6α,9α-difluorohydrocortisone acetate) in 140 milliliters of methanol for fifteen minutes. To this was added a solution of 1.4 grams of potassium bicarbonate in 17.5 milliliters of water likewise treated with nitrogen. After stirring under nitrogen for five hours, the base was neutralized by the addition of 1.5 milliliters of acetic acid in forty milliliters of water. The mixture was then concentrated under reduced pressure at 55 degrees centigrade until crystallization started. The slurry was then cooled in an ice bath, diluted with 100 milliliters of water, and filtered to give 0.892 gram of 6α,9α-difluoro-11β,17α,21-trihydroxy-1,4-pregnadiene-3,20-dione (1-dehydro-6α,9α - difluorohydrocortisone), melting point 232 to 242 degrees centigrade (with decomposition). The analytical sample melted at 250 to 257 degrees centigrade (with decomposition). Analysis gave [α]_D plus 84 degrees (acetone) and the following:

Analysis.—Calculated for $C_{21}H_{26}O_5F_2$: C, 63.62; H, 6.61; F, 9.59. Found: C, 62.76; H, 7.10; F, 9.41.

PREPARATION 18

6α - fluoro - 9α-chloro-11β,17α,21-trihydroxy-1,4-pregnadiene-3,20-dione (1-dehydro-6α-fluoro-9α-chlorohydrocortisone)

Following the procedure of Preparation 17, substitution of 1-dehydro-6α-fluoro-9α-chlorohydrocortisone acetate from Preparation 16 for 1-dehydro-6α,9α-difluorohydrocortisone acetate is productive of 1-dehydro-6α-fluoro-9α-chlorohydrocortisone.

PREPARATION 19

6α - fluoro - 9α-bromo-11β,17α,21-trihydroxy-1,4-pregnadiene-3,20-dione (1-dehydro-6α-fluoro-9α-bromohydrocortisone)

Following the procedure of Preparation 17, substitution of 1-dehydro-6α-fluoro-9α-bromohydrocortisone acetate from Preparation 14 for 1-dehydro-6α,9α-difluorohydrocortisone acetate is productive of 1-dehydro-6α-fluoro-9α-bromohydrocortisone.

Alternatively, the removal of the acetate from 1-dehydro-6α-fluoro-9α-bromohydrocortisone acetate to produce 1-dehydro-6α-fluoro-9α-bromohydrocortisone is accomplished under acid conditions, such as, for example, methanolic hydrochloric acid.

PREPARATION 20

6α,9α-difluoro-17α-hydroxy - 21 - acetoxy - 1,4 - pregnadiene-3,11,20-trione (1-dehydro - 6α,9α - difluorocortisone acetate)

A solution was prepared containing 0.5 gram of 6α,9α-difluoro - 11β,17α - dihydroxy - 21 - acetoxy-1,4-pregnadiene-3,20-dione (1-dehydro-6α,9α-difluorohydrocortisone acetate), 0.15 gram of chromium trioxide, ten milliliters of glacial acetic acid and one-half milliliter of water. This mixture was stirred and maintained at room temperature for eight hours. Thereafter, the excess oxidant was destroyed by addition of methanol and the mixture was poured into fifty milliliters of ice water. The resulting precipitate was collected on a filter and recrystallized from ethyl acetate-Skellysolve B hexanes to give 6α,9α-difluoro-17α-hydroxy-21-acetoxy-1,4-pregnadiene-3,11,20-trione.

PREPARATION 21

6α-fluoro-9α-chloro-17α-hydroxy - 21 - acetoxy-1,4-pregnadiene-3,11,20-trione (1-dehydro-6α-fluoro-9α-chlorocortisone acetate)

Following the procedure of Preparation 20, oxidation of 1-dehydro-6α-fluoro-9α-chlorohydrocortisone acetate of Preparation 16 is productive of 1-dehydro-6α-fluoro-9α-chlorocortisone acetate.

PREPARATION 22

6α-fluoro-9α-bromo-17α-hydroxy - 21 - acetoxy-1,4-pregnadiene-3,11,20-trione (1-dehydro-6α-fluoro-9α-bromocortisone acetate)

Following the procedure of Preparation 20, oxidation of 1-dehydro-6α-fluoro-9α-bromohydrocortisone acetate of Preparation 14 is productive of 1-dehydro-6α-fluoro-9α-bromocortisone acetate.

PREPARATION 23

6α,9α-difluoro-17α,21-dihydroxy-1,4-pregnadiene-3,11,20-trione (1-dehydro-6α,9α-difluorocortisone)

Following the procedure of Preparation 17 but substituting 1-dehydro-6α,9α-difluorocortisone acetate as the starting material therein is productive of 1-dehydro-6α,9α-difluorocortisone.

PREPARATION 24

6α-fluoro-9α-chloro-17α,21-dihydroxy - 1,4 - pregnadiene-3,11,20-trione (1-dehydro-6α-fluoro-9α-chlorocortisone)

Following the procedure of Preparation 17 but substituting 1-dehydro-6α-fluoro-9α-chlorocortisone acetate of Preparation 21 as the starting material therein is productive of 1-dehydro-6α-fluoro-9α-chlorocortisone.

PREPARATION 25

6α-fluoro-9α-bromo-17α,21-dihydroxy - 1,4 - pregnadiene-3,11,20-trione (1-dehydro-6α-fluoro-9α-bromocortisone)

Following the procedure of Preparation 17 but substituting 1-dehydro-6α-fluoro-9α-bromocortisone acetate of Preparation 22 as the starting material therein is productive of 1-dehydro-6α-fluoro-9α-bromocortisone.

PREPARATION 26

6β-epimers

Substituting 6β-fluorohydrocortisone acetate for starting material in Preparation 11 and retaining the 6β configuration in subsequent steps by careful maintenance of near neutral reaction condition, 6β-epimers, such as 1-dehydro - 6β,9α - difluorohydrocortisone, 1 - dehydro - 6β-fluoro-9α-chlorohydrocortisone, 1 - dehydro-6β-fluoro-9α-bromohydrocortisone, 1-dehydro-6β,9α-difluorocortisone, 1-dehydro-6β-fluoro-9α-chlorocortisone and 1-dehydro-6α-fluoro-9α-bromocortisone, are produced. The thus obtained 6β-epimers yield the 6α-epimers by treatment with acid according to the procedure of Preparation 9.

EXAMPLE 1

6α,9α-difluoro-11β,17α,21-trihydroxy - 1,4 - pregnadiene-3,20-dione 21-methanesulfonate To a solution of 0.925 gram of 6α,9α-difluoro-11β,17α,-21-trihydroxy-1,4-pregnadiene-3,20-dione in ten milliliters of pyridine previously cooled to zero to five degrees centigrade was added 0.9 milliliter of methanesulfonyl chloride. The reaction mixture was stirred at zero to five degrees centigrade for seventeen hours, and was then poured into 100 milliliters of cold five percent hydrochloric acid to precipitate the solid mesylate. The product, after filtration, weighed 0.832 gram, and had a melting point of 157 degrees centigrade (with decomposition). This was used in the next step without further purification.

EXAMPLE 2

6α,9α,21-trifluoro-11β,17α-dihydroxy - 1,4 - pregnadiene-3,20-dione (1 - dehydro - 6α,9α,21-trifluoro-21-desoxyhydrocortisone)

A mixture of 0.5 gram of 6α,9α-difluoro-11β,17α,21-trihydroxy - 1,4 - pregnadiene-3,20-dione 21-methanesulfonate and 0.37 gram of potassium fluoride in ten milliliters of dimethylsulfoxide was stirred and heated on a steam bath for seventeen hours. The reaction mixture was then cooled, poured into 150 milliliters of water, and extracted with four 100-milliliter fractions of ethyl acetate. After drying over sodium sulfate, the ethyl acetate solution was evaporated to dryness and the residue (452 milligrams) was purified by chromatography over a column of synthetic magnesium silicate and crystallization from acetone-Skellysolve B hexanes to give 63 milligrams of 6α,9α,21-trifluoro-11β,17α-dihydroxy-1,4-pregnadiene-3,20-dione of melting point 267 to 272 degrees centigrade (with decomposition). The analytical sample recrystallized from ethyl acetate, melted at 273 to 277 degrees centigrade.

Analysis.—Calculated for $C_{21}H_{25}O_4F_3$: F, 14.31. Found: F, 13.06.

EXAMPLE 3

6α,9α,21-trifluoro-11β,17α-dihydroxy - 1,4 - pregnadiene-3,20-dione (1 - dehydro - 6α,9α,21-trifluoro-21-desoxyhydrocortisone)

To a solution of 0.5 gram of 6α,9α-difluoro-11β,17α,21-trihydroxy-1,4-pregnadiene - 3,20 - dione 21-methanesulfonate in 65 milliliters of acetone was added a solution of 0.65 gram of sodium iodide in seven milliliters of acetone. The mixture was allowed to reflux on the steam bath for about ten minutes and was then concentrated to dryness under reduced pressure. The resulting 21-iodide was dissolved in 55 milliliters of acetonitrile at fifty to sixty degrees centigrade, in the dark, and was treated with 0.4 milliliter of fifty percent aqueous solution of silver fluoride. Addition of silver fluoride was in three equal portions at one-half hour intervals. After maintaining at this temperature for a total of one and one-half hours, the temperature was lowered to forty to fifty degrees centigrade for an additional two and one-half hours. The solvent was then removed under reduced pressure at fifty degrees centigrade and the black residue was digested with three fifty-milliliter portions of acetone. The product, contained in the acetone solution, was purified by chromatography over a column of synthetic magnesium silicate and crystallized from acetone-Skellysolve B hexanes to give crystalline 1-dehydro-6α,9α,21-trifluoro-21-desoxyhydrocortisone.

EXAMPLE 4

6α,21 - difluoro - 9α - chloro - 11β,17α - dihydroxy - 1,4-pregnadiene-3,20-dione (1 - dehydro-6α,21-difluoro-9α-chloro-21-desoxyhydrocortisone)

Following the procedures of Examples 1 through 3 but substituting 1-dehydro-6α-fluoro-9α-chlorohydrocortisone of Preparation 18 as starting material therein is productive of 1 - dehydro - 6α,21 - difluoro-9α-chloro-21-desoxyhydrocortisone.

EXAMPLE 5

6α,21 - difluoro - 9α - bromo - 11β,17α - dihydroxy - 1,4-pregnadiene-3,20-dione (1 - dehydro-6α,21-difluoro-9α-bromo-21-desoxyhydrocortisone)

Following the procedures of Examples 1 through 3, but substituting 1-dehydro-6α-fluoro-9α-bromohydrocortisone of Preparation 19 as starting material is productive of 1 - dehydro - 6α,21 - difluoro-9α-bromo-21-desoxyhydrocortisone.

EXAMPLE 6

6α,9α,21 - trifluoro - 17α - hydroxy - 1,4-pregadiene-3,11,20-trione (1-dehydro-6α,9α,21-trifluoro-21-desoxycortisone)

A solution is prepared containing 0.5 gram of 6α,9α,21-trifluoro - 11β,17α - dihyroxy - 1,4 - pregnadiene - 3,20-dione, 0.15 gram of chromium trioxide, ten milliliters of glacial acetic acid and one-half milliliter of water. This mixture is stirred and maintained at room temperature for eight hours. Thereafter, the excess oxidant is destroyed by addition of methanol and the mixture is poured into fifty milliliters of ice water. The resulting precipitate is collected on a filter and recrystallized from ethyl acetate to give 6α,9α,21-trifluoro-17α-hydroxy-1,4-pregnadiene-3,11,20-trione.

EXAMPLE 7

6α,9α,21 - trifluoro - 17α - hydroxy - 1,4-pregadiene-3,11,20-trione (1-dehydro-6α,9α,21-difluoro-21-desoxycortisone)

In the same manner shown in Examples 1 and 2, treating 6α,9α-difluoro-17α,21-dihydroxy-1,4-pregnadiene-3,11,20-trione with methanesulfonyl chloride in pyridine solution yields 6α,9α-difluoro-17α,21-dihydroxy-1,4-pregnadiene - 3,11,20 - trione 21-methanesulfonate. Heating the said 21-methanesulfonate with potassium fluoride in dimethylsulfoxide is productive of 6α,9α,21-trifluoro-17α-hydroxy-1,4-pregnadiene-3,11,20-trione.

EXAMPLE 8

6α,21 - difluoro - 9α - chloro - 17α - hydroxy - 1,4-pregnadiene - 3,11,20 - trione (1-dehydro-6α,21-difluoro-9α-chloro-21-desoxycortisone)

Following the procedure of Example 6, oxidation of 1 - dehydro - 6α,21 - difluoro - 9α - chloro - 21-desoxyhydrocortisone of Example 4 is productive of 1-dehydro-6α,21-difluoro-9α-chloro-21-desoxycortisone.

Alternatively, 1 - dehydro - 6α,21-difluoro-9α-chloro-21-desoxycortisone is prepared by following the procedures of Examples 1 and 2 and substituting 1-dehydro-6α-fluoro-9α-chlorocortisone of Preparation 24 as starting material therein.

EXAMPLE 9

6α,21 - difluoro - 9α - bromo - 17α - hydroxy - 1,4 - pregnadiene - 3,11,20 - trione (1-dehydro-6α,21-difluoro-9α-bromo-21-desoxycortisone)

Following the procedure of Example 6, oxidation of 1 - dehydro - 6α,21 - difluoro - 9α - bromo - 21 - desoxyhydrocortisone of Example 5 is productive of 1-dehydro-6α,21-difluoro-9α-bromo-21-desoxycortisone.

Alternatively, 1 - dehydro-6α,21-difluoro-9α-bromo-21-desoxycortisone is prepared by following the procedures of Examples 1 and 2 and substituting 1-dehydro-6α-fluoro-9α-bromocortisone of Preparation 25 as starting material therein.

EXAMPLE 10

6β-epimers

Substituting 1-dehydro-6β,9α-difluorohydrocortisone or other 1 - dehydro - 6β - fluoro - 9α-halohydrocortisones or -cortisones for the starting material in Example 1 and retaining the 6β configuration in subsequent steps by careful maintenance of near neutral reaction conditions, 6β-epimers, such as 6β,9α,21-trifluoro-11β,17α-dihydroxy-1,4 - pregnadiene - 3,20-dione, 6β,21 - difluoro - 9α-chloro-11β,17α - dihydroxy - 1,4 - pregnadiene-3,20-dione, 6β,21-difluoro - 9α - bromo - 11β,17α - dihydroxy - 1,4-pregnadiene-3,20-dione, 6β,21-difluoro-17α-hydroxy-1,4-pregnadiene - 3,11,20 - trione, 6β,21 - difluoro - 9α-chloro-17α-hydroxy - 1,4 - pregnadiene-3,11,20-trione, 6β,21-difluoro-9α - bromo - 17α - hydroxy - 1,4-pregnadiene - 3,11,20-trione, are produced. The thus obtained 6β-epimers yield the corresponding 6α-epimers by treatment with acid according to the procedure of Preparation 9.

It is to be understood that the invention is not to be limited to the exact details of operation or exact compounds shown and described, as obvious modifications and equivalents will be apparent to one skilled in the art. The invention is therefore to be limited only by the scope of the appended claims.

We claim:

1. A compound selected from the group consisting of 1 - dehydro - 6,21 - difluoro - 9α - halo - 21 - desoxyhydrocortisone and 1 - dehydro - 6,21 - difluoro - 9α-halo-21-desoxycortisone, wherein the 9α-halogen is of atomic weight between seventeen and eighty, inclusive.

2. A compound selected from the group consisting of 1 - dehydro - 6α,21 - difluoro - 9α - halo - 21-desoxyhydrocortisone and 1 - dehydro-6α,21 - difluoro - 9α-halo-21-desoxycortisone, wherein the 9α-halogen is of atomic weight between seventeen and eighty, inclusive.

3. 1 - dehydro - 6α,21 - difluoro - 9α - halo - 21-desoxyhydrocortisone, wherein the 9α-halogen is of atomic weight between seventeen and eighty, inclusive.

4. 1 - dehydro - 6α,9α,21 - trifluoro - 21 - desoxyhydrocortisone.

5. 1 - dehydro - 6α,21 - difluoro - 9α - chloro - 21-desoxyhydrocortisone.

6. 1 - dehydro - 6α,21 - difluoro - 9α - bromo - 21-desoxyhydrocortisone.

7. 1 - dehydro - 6α,21 - difluoro - 9α - halo - 21-desoxycortisone, wherein the 9α-halogen is of atomic weight between seventeen and eighty, inclusive.

8. 1-dehydro-6α,9α,21-trifluoro-21-desoxycortisone.

9. 1 - dehydro - 6α,21 - difluoro - 9α - chloro - 21-desoxycortisone.

10. 1 - dehydro - 6α,21 - difluoro - 9α - bromo - 21-desoxycortisone.

References Cited in the file of this patent

UNITED STATES PATENTS

| | | |
|---|---|---|
| 2,783,226 | Gould et al. | Feb. 26, 1957 |
| 2,813,883 | Herr | Nov. 19, 1957 |
| 2,814,632 | Nussbaum | Nov. 26, 1957 |

OTHER REFERENCES

Tannhauser et al.: J. A. C. S. 78, 2658–9 (1956).
Herz et al.: J. A. C. S. 78, 4812 (1956).

UNITED STATES PATENT OFFICE
Certificate of Correction

Patent No. 2,838,537                                                            June 10, 1958

George B. Spero et al.

It is hereby certified that error appears in the printed specification of the above numbered patent requiring correction and that the said Letters Patent should read as corrected below.

Column 4, line 62, for "atoms" read —atom—; column 5, line 1, for "reached" read —reacted—; lines 4 and 5, for "defluoro" read —difluoro—; column 7, line 73, for "6β-" read —6α- —; column 10, line 51, for the empirical formula reading "$C_{23}H_{28}O_6F_3$:" read —$C_{23}H_{28}O_6F_2$:—.

Signed and sealed this 18th day of November 1958.

[SEAL]

Attest:
KARL H. AXLINE,
*Attesting Officer.*

ROBERT C. WATSON,
*Commissioner of Patents.*